US012640050B2

(12) United States Patent     (10) Patent No.:   US 12,640,050 B2

Thompson et al.     (45) Date of Patent:     May 26, 2026

(54) AIRCRAFT SIMULATION YOKE, AND ASSOCIATED SYSTEMS AND METHODS

(71) Applicant: Specular Theory, Inc., Venice, CA (US)

(72) Inventors: Mitchel Thompson, Livermore, CA (US); Daniel Michelson, Oakland, CA (US)

(73) Assignee: SPECULAR THEORY, INC., Venice, CA (US)

( * ) Notice: Subject to any disclaimer, the term of this patent is extended or adjusted under 35 U.S.C. 154(b) by 794 days.

(21) Appl. No.: 18/158,931

(22) Filed: Jan. 24, 2023

(65) Prior Publication Data

US 2024/0249639 A1     Jul. 25, 2024

(51) Int. Cl.
*G09B 9/28*     (2006.01)

(52) U.S. Cl.
CPC ...................................... *G09B 9/28* (2013.01)

(58) Field of Classification Search
CPC ... G09B 9/28; G09B 9/08; G09B 9/02; G09B 9/04; G09B 9/12; G09B 9/14; G09B 9/302; G09B 9/307; G05G 9/047; A63F 13/42; A63F 13/245
USPC ..................................................... 434/45, 30
See application file for complete search history.

(56) References Cited

U.S. PATENT DOCUMENTS

| | | | |
|---|---|---|---|
| 4,659,313 A | 4/1987 | Kuster et al. | |
| 4,713,007 A | 12/1987 | Alban | |
| 5,317,336 A | 5/1994 | Hall | |
| 8,235,723 B2 | 8/2012 | Macalister | |
| 9,245,453 B1 | 1/2016 | Macalister | |
| 2015/0115848 A1 | 4/2015 | McFadden | |
| 2019/0244537 A1 | 8/2019 | Liberatore et al. | |

OTHER PUBLICATIONS

International Search Report and Written Opinion for PCT/US24/12604 by U.S. International Search Authority mailed on Jun. 27, 2024, 14 pages.
Thrustmaster website: https://shop.thrustmaster.com/en_gb/tca-yoke-boeing-edition.html (publication date unknown).
Hall, Charlie, "Thrustmaster's Boeing yoke really does just work with Microsoft Flight Simulator on Xbox", Review dated Nov. 9, 2021 website: https://www.polygon.com/reviews/22772510/thrustmaster-tca-yoke-boeing-edition-xbox-review-microsoft-flight-simulator.
YouTube "Thustmaster Boeing Yoke—is it worth $500?" website: https://www.youtube.com/watch?v=P0PYskMlumE 2022.

*Primary Examiner* — Kang Hu
*Assistant Examiner* — Anthony James Bulthuis
(74) *Attorney, Agent, or Firm* — David R. Stevens; Stevens Law Group

(57) ABSTRACT

Aircraft simulation yokes, and associated systems and methods are disclosed herein. A representative system includes a yoke handle, and an anchoring device operably connected to the yoke handle. The anchoring device includes a first linkage pivotably coupled to a first section of the yoke handle, a second linkage pivotably coupled to a second section of the yoke handle, and a connector coupled to the first linkage and the second linkage. When the yoke handle is pushed or pulled, a translational movement of one of the linkages is greater than a translational movement of the other linkage such that the yoke handle tilts about a rotation axis offset from the yoke handle.

20 Claims, 9 Drawing Sheets

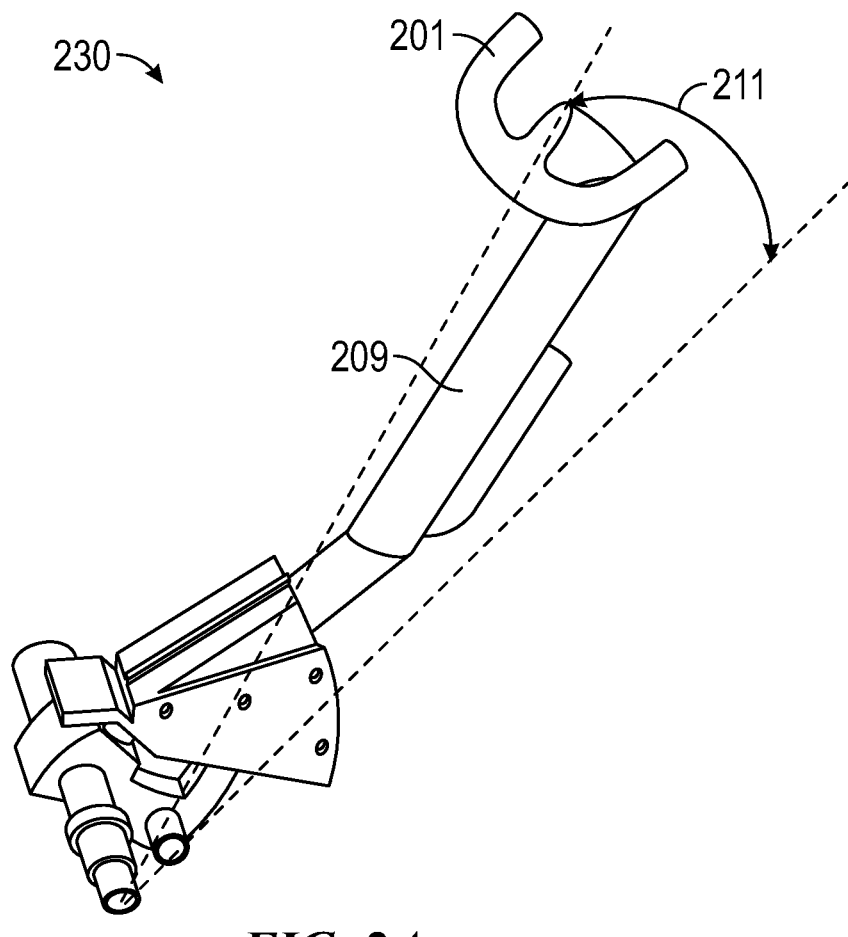
230
201
211
209
FIG. 2A
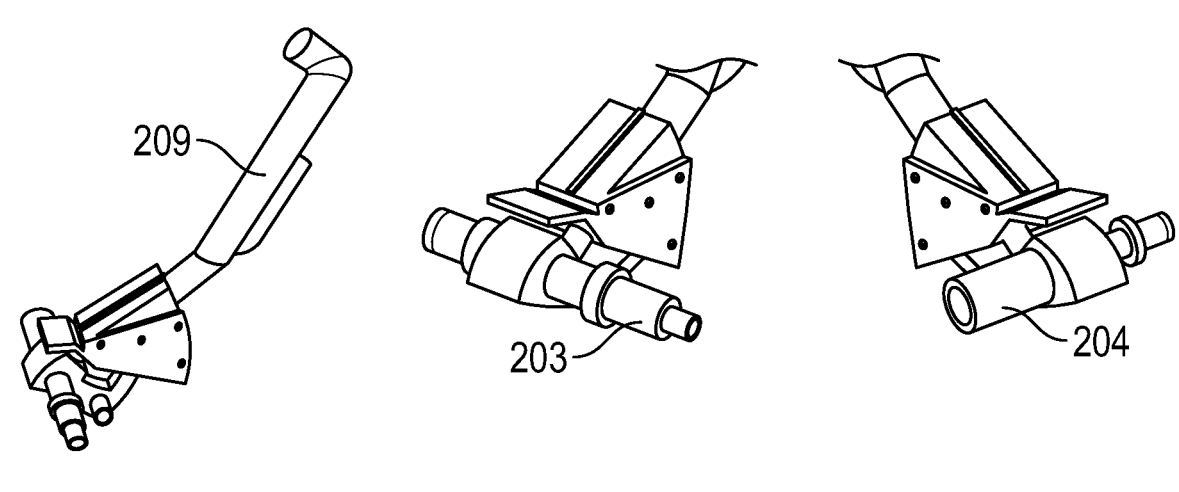
209
203
204
FIG. 2B          FIG. 2C          FIG. 2D

300

301

330

309

303

400

401

400

401

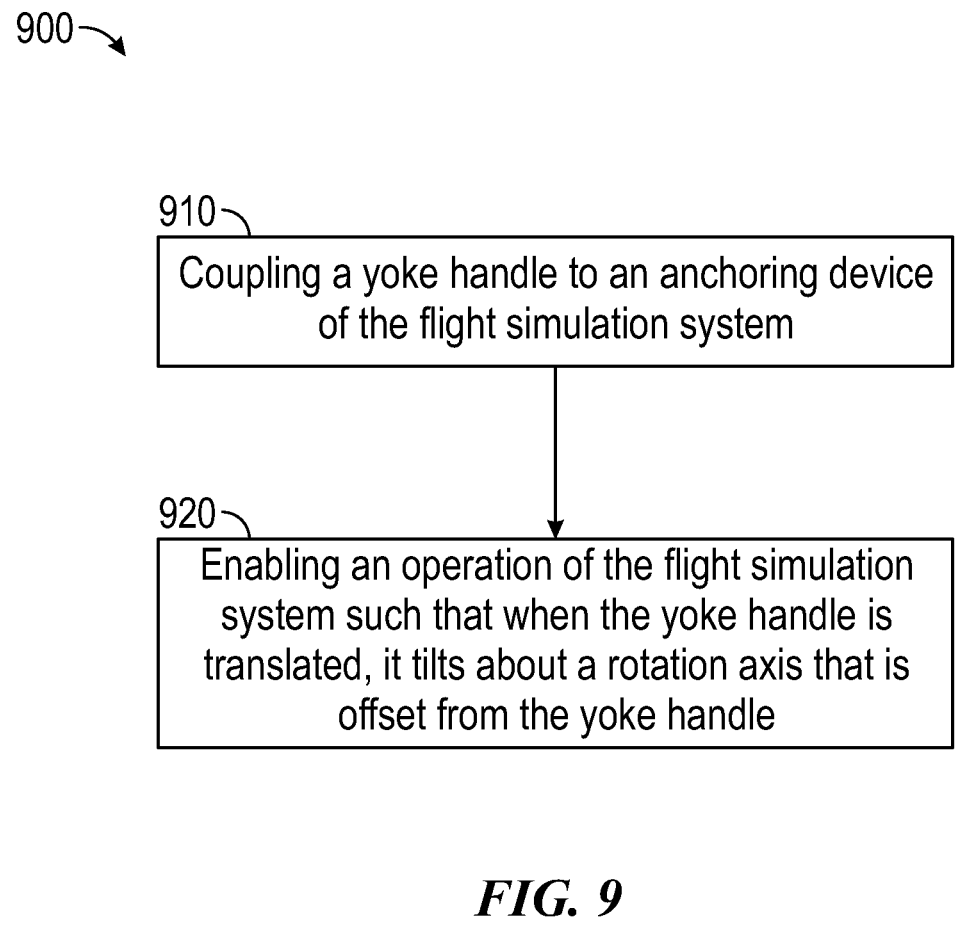

900

910

Coupling a yoke handle to an anchoring device
of the flight simulation system

920

Enabling an operation of the flight simulation
system such that when the yoke handle is
translated, it tilts about a rotation axis that is
offset from the yoke handle

*FIG. 9*

AIRCRAFT SIMULATION YOKE, AND ASSOCIATED SYSTEMS AND METHODS

STATEMENT REGARDING FEDERALLY SPONSORED RESEARCH

This invention was made with government support under contract number FA8621-21-C-0061. The government has certain rights in this invention.

TECHNICAL FIELD

The present technology is directed generally to aircraft simulation yokes, and associated systems and methods.

BACKGROUND

A flight simulation system is a system that artificially simulates aircraft flight and the environment in which the aircraft flies, e.g., for pilot training, aircraft design, and/or other purposes. Training using a flight simulation system can increase the pilot's proficiency level at a lower cost than flying an actual aircraft. In addition, flight simulation systems permit pilots to practice emergency procedures and other demanding skills with a level of safety that may not be possible in actual aircraft. However, it is important to accurately simulate the "feel" of the pilot's control devices, e.g., the yoke, which controls aircraft pitch and roll. Typical existing devices either fail to accurately do so, or require large, complex, and/or cumbersome systems to do so.

BRIEF DESCRIPTION OF THE DRAWINGS

FIG. 2A illustrates a yoke with an example anchoring mechanism in an actual aircraft.

FIG. 2B illustrates an example anchoring mechanism of a control yoke in an actual aircraft.

FIG. 2C illustrates an example shaft in an anchoring mechanism of a control yoke in an actual aircraft.

FIG. 2D illustrates another example shaft in an anchoring mechanism of a control yoke in an actual aircraft.

FIG. 9 is a flowchart representation of a method of making/using a flight simulation system in accordance with one or more embodiments of the present technology.

DETAILED DESCRIPTION

Figure 1:
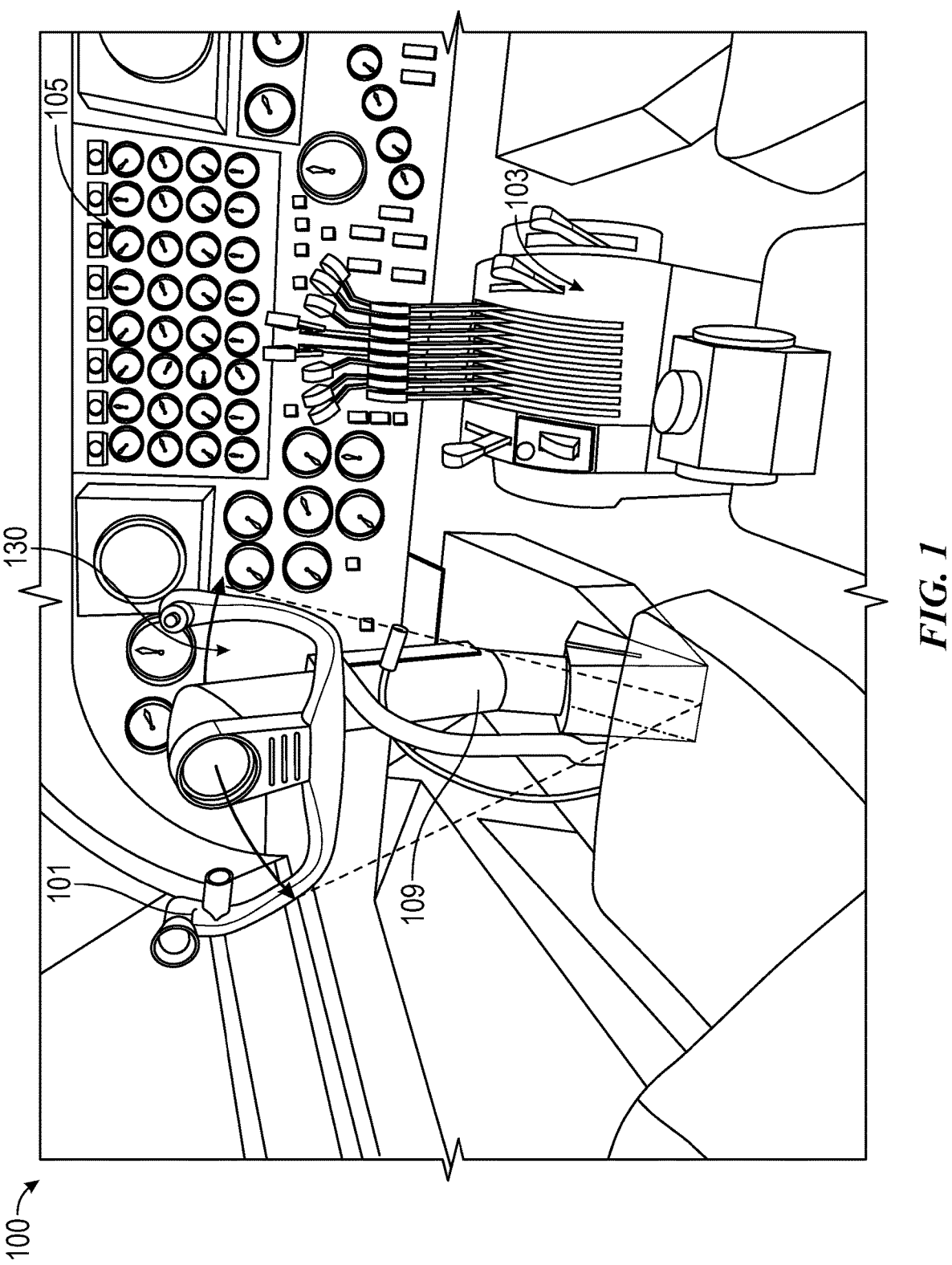
FIG. 1 illustrates an example control system in a cockpit of an actual aircraft.

Operating an aircraft is a complex task. An aircraft is controlled by deflecting flight control surfaces, under pilot control, during takeoff, flight maneuvering, and landing. The flight control surfaces are operated by the pilot through a series of mechanical and/or electrical connecting links. FIG. 1 illustrates an example control system in a cockpit or flight deck of an aircraft. As shown in FIG. 1, the control system 100 comprises at least a control yoke 130 having a yoke handle 101 coupled to a control column 109 to control the pitch and roll of the aircraft, and a throttle control 103 to control engine speed or thrust. In typical embodiments, the control system 100 includes rudder pedals (not shown) to control yaw about a vertical axis. The control system also includes multiple instruments 105 to provide aircraft information (e.g., speed, altitude, attitude, climb/descent, heading, turning/banking, etc.).

When operating an aircraft, pitch is controlled by pulling or pushing the control yoke 130, which makes the nose of the aircraft ascend or descend, respectively. In an actual aircraft, referring back to FIG. 1, the control column 109 is anchored at or below the cockpit floor, and rotates about a rotation axis at or below on the cockpit floor. FIGS. 2A-2D illustrate the anchoring mechanism of a control yoke 230 in an actual aircraft. As shown in FIG. 2A and FIG. 2B, the yoke handle 201 is connected to a column or rod 209. The rod 209 can be connected to one or two shafts 203, 204, as shown in FIGS. 2C and 2D, that are coaxially attached to, or positioned below, the floor to provide a rotational axis for the control yoke 230. For example, as shown in FIG. 2A, the yoke handle 201 moves along a curve 211 when the pilot pushes or pulls the control yoke 230.

Figure 3:
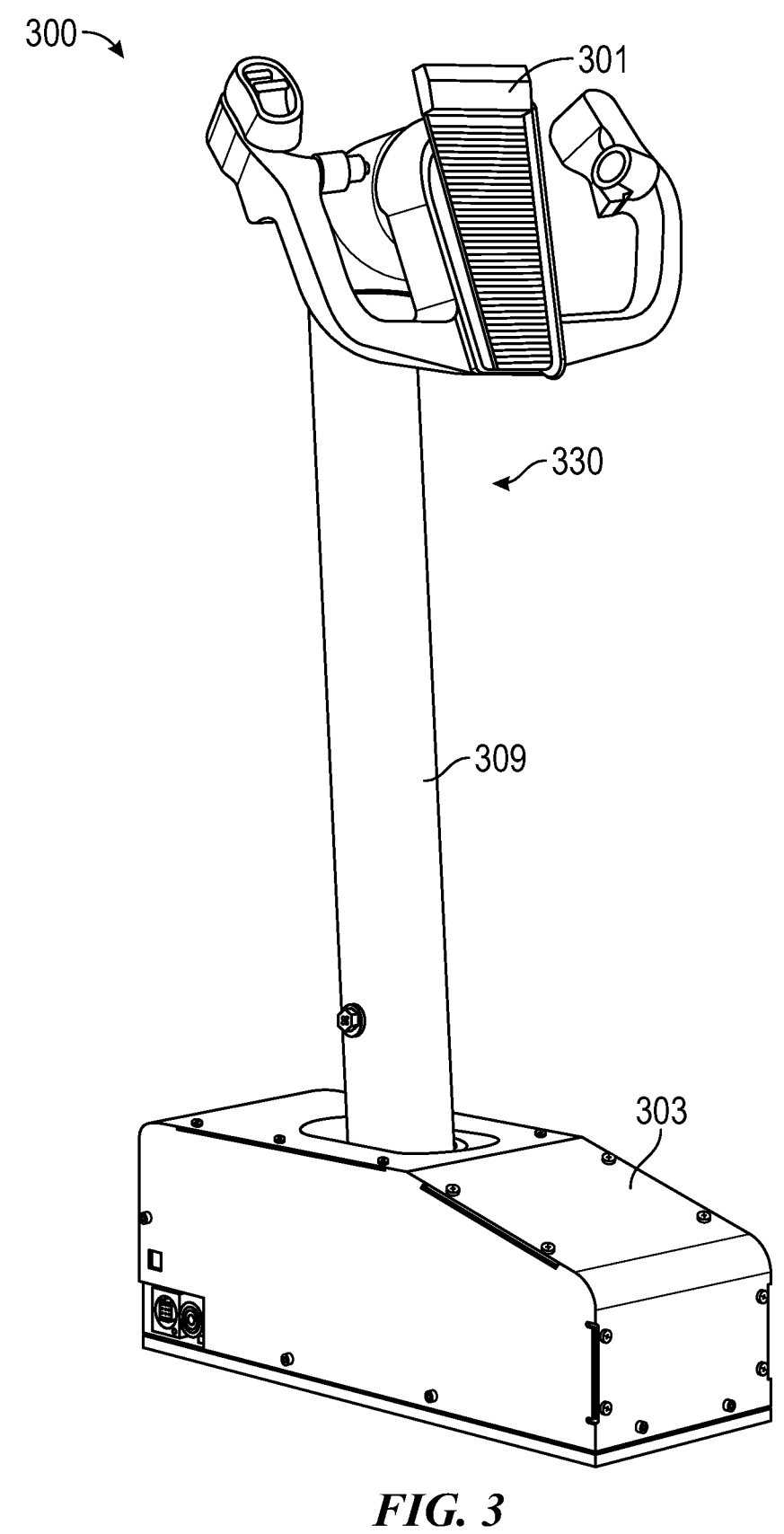
FIG. 3 illustrates an example yoke simulation system configured in accordance with the prior art.
Figure 4A:
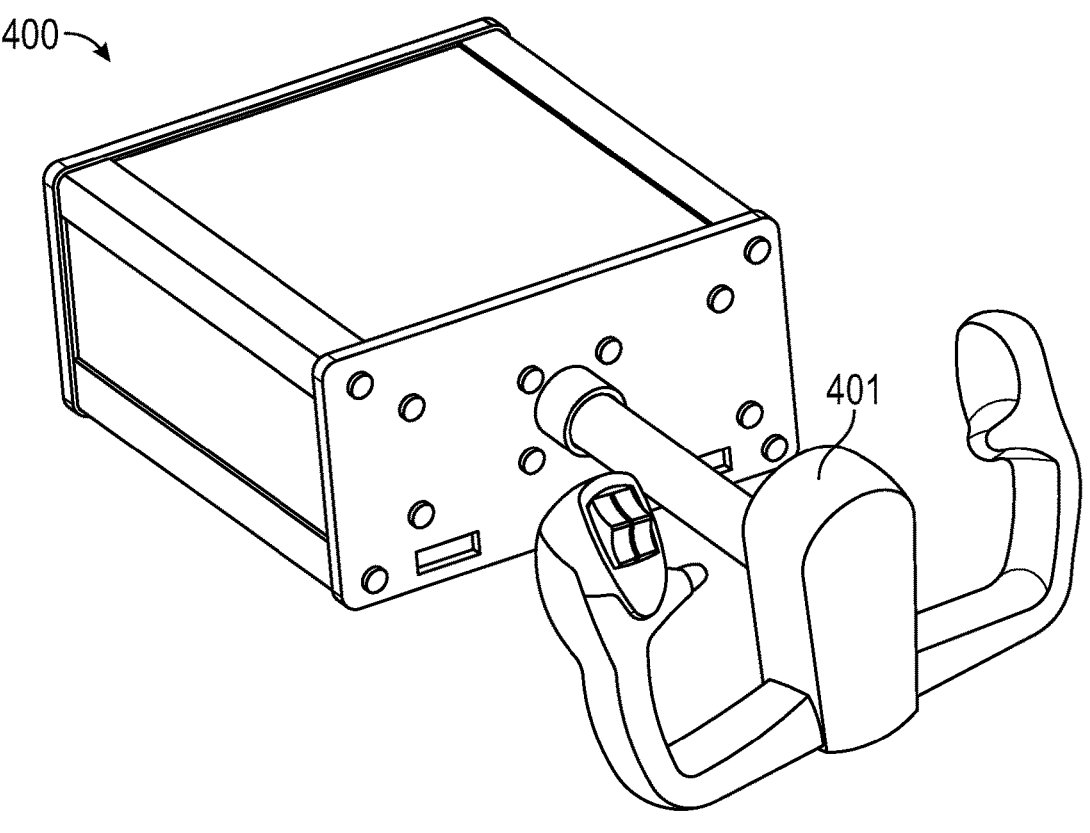
FIG. 4A illustrates a perspective view of an example yoke simulation system configured in accordance with the prior art.
Figure 4B:
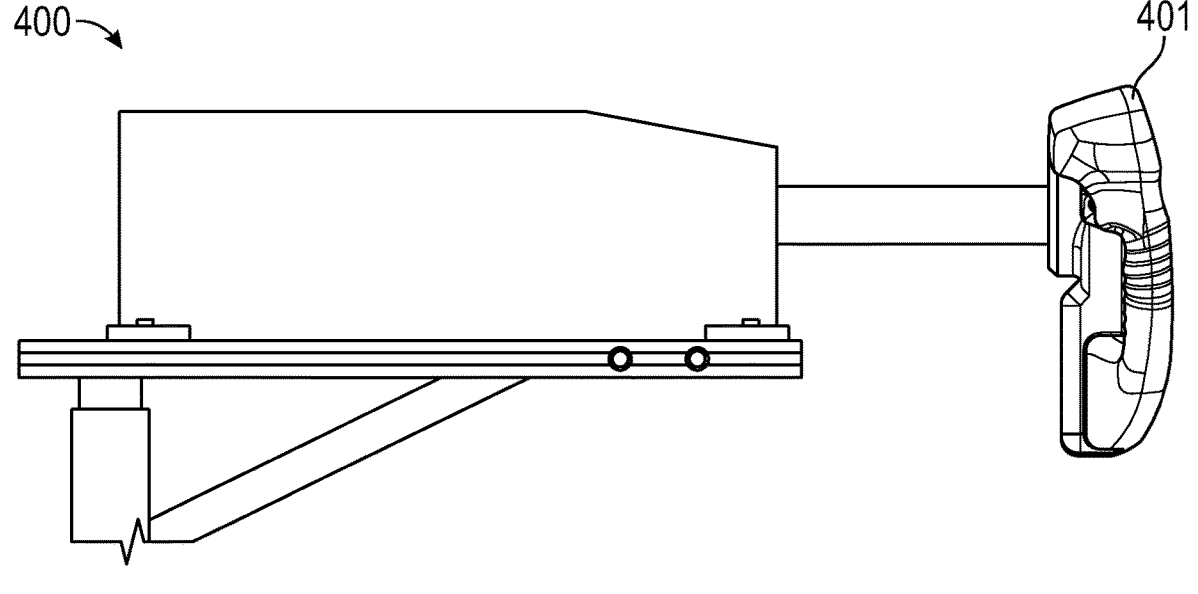
FIG. 4B illustrates a side view of the example yoke simulation system in FIG. 4A.

To enable safe and effective practice of aircraft operation procedures, there remains a need to provide sufficient ground training before a pilot transitions to operating an actual aircraft (also referred to herein as a "real" aircraft). In the past, a complete simulation of the real yoke has been provided. FIG. 3 illustrates an example yoke simulation system 300 configured in accordance with the prior art. The control yoke 330 includes a yoke handle 301 coupled to a column 309 which is anchored to a ground compartment or base 303 to simulate the movement of a real yoke. In operation, the pilot pushes or pulls the control yoke 330, and the base 303 provides a resistive force to simulate the forces a pilot would feel in an actual aircraft. Because the pilot has a much larger lever arm than the mechanism that provides the resistive force, that mechanism must output much more force than the pilot. This in turn requires heavy, bulky and/or expensive motors, hydraulics, and/or other devices. To provide a more compact training system, alternative existing designs of the yoke simulation system have been proposed. FIGS. 4A and 4B illustrate an example yoke simulation system 400 that is more compact and does not require as much resistive force to simulate the actual feedback at the yoke. However, as shown in FIG. 4B, the yoke 401 can only translate back and forth, and does not properly simulate the tilting motion of the handle, shown by curve 211 in FIG. 2A. Accordingly, such devices detract from effective ground training.

The present technology includes techniques that can be implemented in various embodiments to provide a compact flight simulation system with realistic yoke pivoting or tilting action. In some embodiments, a flight simulation system implemented using the disclosed techniques includes a yoke having a yoke handle. The yoke handle can be coupled to an anchoring device to simulate the pivoting motion of the yoke handle in a real aircraft. The flight simulation system can be compact, easily disassembled, and/or easily transported to different training locations. The system can also be part of a virtual reality (VR) training system, e.g., users can operate the yoke with a VR headset to provide a realistic flight experience.

Figure 5:
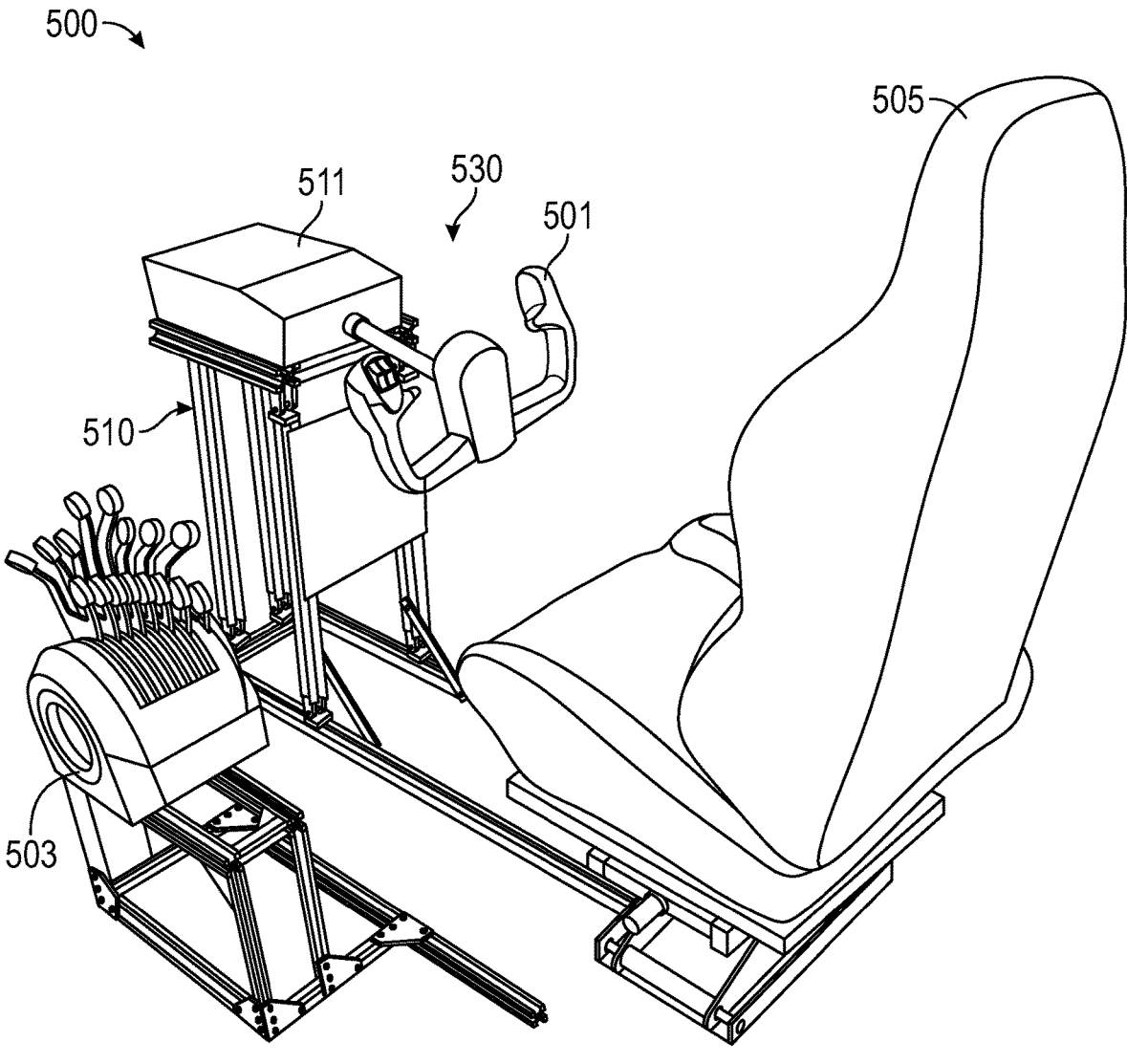
FIG. 5 illustrates an example flight simulation system configured in accordance with one or more embodiments of the present technology.

FIG. 5 illustrates a representative flight simulation system 500 configured in accordance with one or more embodiments of the present technology. The flight simulation system 500 includes a control yoke 530 having a yoke handle 501, and that can be removably attached to a foldable platform 510. The system 500 also includes an anchoring compartment 511. Within the anchoring compartment 511, an anchoring device can be provided to anchor and control the motion of the handle 501. The flight simulation system 500 can also include a throttle 503 and a seat 505 that are removably coupled to the foldable simulation platform 510 to provide a complete training experience. To prepare the flight simulation system 500 for use, the user can connect the control yoke 530 and the throttle 503 to a feedback subsystem, such as an external display that optionally includes an audio speaker (not shown), and/or a VR headset (not shown), to perform the training procedures.

Within the anchoring compartment 511, a compact anchoring device can be provided to simulate the pivoting motion that the handle 501 undergoes in a real aircraft control. As will be described in further detail below with reference to FIG. 6, the anchoring device can include a first bar (or other elongated member) removably coupled to an upper section of the yoke handle 501, a second bar (or other elongated member) removably coupled to a lower section of the yoke handle 501, and a connector configured to connect the first bar and the second bar. The connector can include a coupling mechanism or an interlinking mechanism such that the first bar and the second bar are translationally interlinked.

In some embodiments, the first bar and the second bar move at slightly different rates, under the driving force of the user and/or an actuator or motor, to simulate the rotation of the yoke handle 501 around an axis below the handle, e.g., below the seat 505, or at or below the floor on which the system is supported. The yoke handle 501 is constrained to tilt as it is moved back and forth, as a result of movements of the first bar and the second bar. When the yoke is pushed in a first direction, the first bar is configured to move along the first direction and to drive the second bar to move along the first direction at a different rate. The movement differential of the second bar relative to the first bar can push the lower section of the yoke handle 501 such that the yoke handle is tilted at a first angle. When the yoke handle 501 is pulled in the second direction, the first bar is configured to move along a second, opposite direction and to drive the different translational movement of the second bar such that the yoke handle 501 is tilted at a second angle. The tilted positions of the yoke handle 501 can simulate the positions of the real yoke handle along the curve 211 when the pilot pushes or pulls the yoke (e.g., as shown in FIG. 2A).

Figure 6:
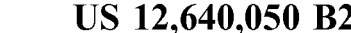
FIG. 6 illustrates an example anchoring device configured in accordance with one or more embodiments of the present technology.

FIG. 6 illustrates a representative anchoring device 600 configured in accordance with one or more embodiments of the present technology. In this example, a connector 620 includes one or more pinions (circular gears) 621, 623 while the first bar 603 and the second bar 605 include corresponding racks (linear gears) 604, 606. The two pinions 621, 623 are connected to each other to rotate together as a unit, with each pinion 621, 623 meshed with the teeth of a corresponding rack 604, 606. The teeth spacings (e.g., pitches) of the two pinions 621, 623 and the corresponding racks 604, 606 are different such that, for every revolution of the pinions, the first rack 604 of the first bar 603 moves a slightly different amount than the second rack 606 of the second bar 605.

The first bar 603 includes a first interface 613 (e.g., a pinned joint) that can be coupled to a first section (e.g., an upper section) of the yoke handle 501 (FIG. 5). The second bar 605 includes a second interface 615 (e.g., a pinned slot joint) that can be coupled to a second section (e.g., a lower section) of the yoke handle 501. The yoke handle 501 can be attached to the first bar 603 and the second bar 605 through the first interface 613 (e.g., a pinned joint) and the second interface 615 (e.g., a pinned slot joint), thus constraining it to tilt as a result of relative movements of the first bar 603 and the second bar 605. As the first bar and the second bar move (e.g., translate) at slightly different rates, the yoke handle 501 tilts in a way that simulates a rotation of the yoke handle around an axis closer to the floor. In this example, it has been found that the motion of the yoke handle deviates only two percent from the motion of a corresponding yoke handle in real aircraft.

Figures 7A, 7B, 7C:
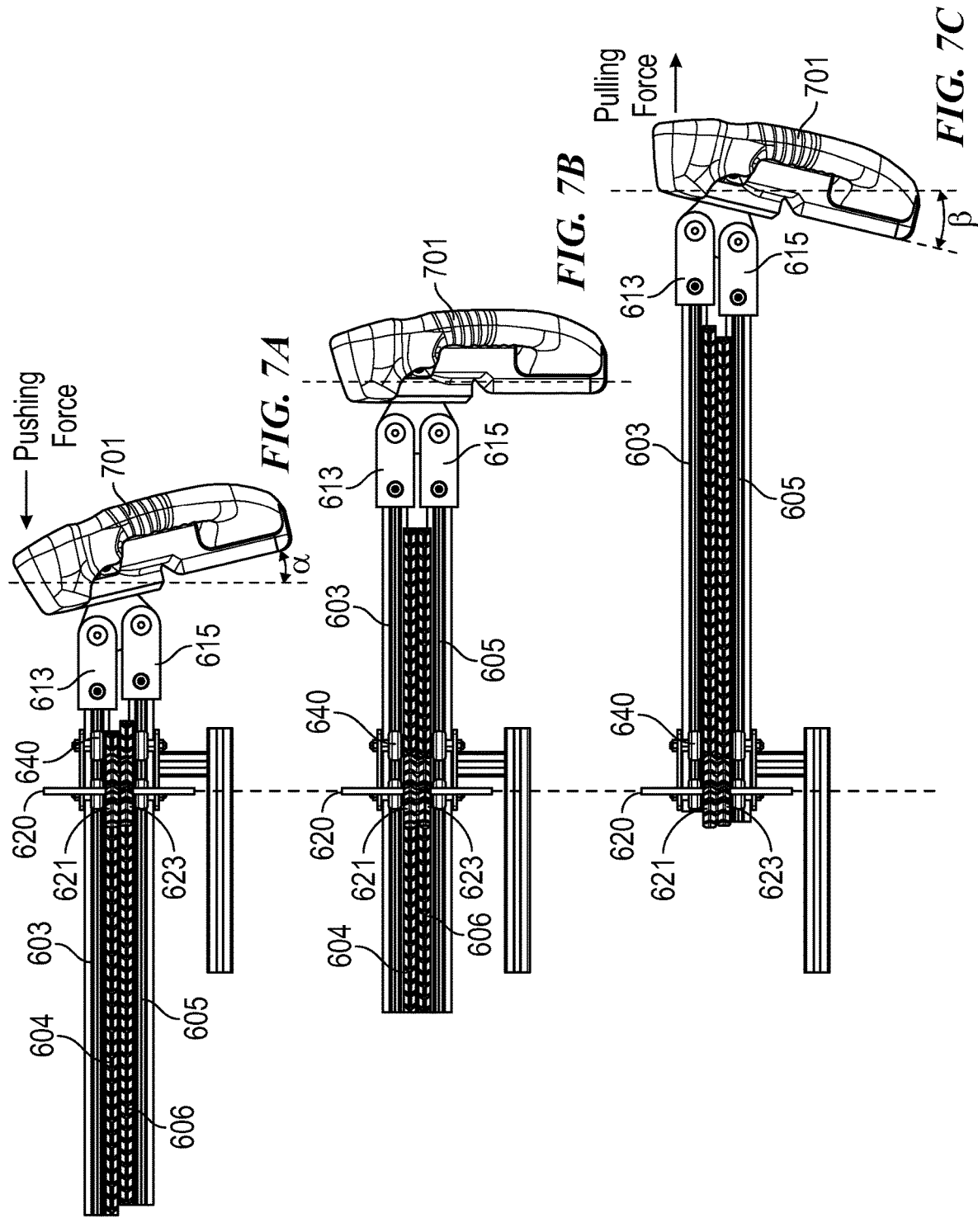
FIGS. 7A-7C illustrate the movements of an example yoke configured in accordance with one or more embodiments of the present technology.

FIG. 7A illustrates the movements of a representative yoke handle 701 in accordance with one or more embodiments of the present technology. When the yoke handle 701 is pushed, the pushing force is applied to one or both of the interfaces 613, 615. The pushing force drives a translational movement of one or both of the bars 603, 605. The connector 620 links the motions of the two bars 603, 605, and is carried by a backet 640 that is generally fixed relative to the support structure 600 (FIG. 6) and/or the anchoring compartment 510 (FIG. 5). The different teeth spacings of the corresponding two racks 604, 606 cause the second rack 606 of the second bar 605 to have different translational movement than that of the first rack 603, thereby generating a tilt angle α that simulates the pivoting motion in a real aircraft when the yoke is fully pushed forward.

When the yoke handle is pulled, the pulling force is applied to one or both of the interfaces 613, 615 via the upper section of the yoke handle 701. The pulling force drives movement of the first bar 603. The connector 620 (e.g., the first and second pinions 621, 623) and the different teeth spacings of the two racks 604, 606 cause the second bar 605 to undergo a different translational movement as compared to the first bar 603, to place the yoke handle first in a vertical position (FIG. 7B). and then at a tilt angle β (FIG. 7C) that simulates the pivoting motion in real aircraft when the yoke handle 701 is fully pulled back. The translational movement, together with the tilting action of the yoke handle 701, makes the yoke handle behave as though it is pivoting about a rotation axis well below the yoke handle itself, e.g., at or below the cockpit floor.

Figures 8A, 8B, 8C:
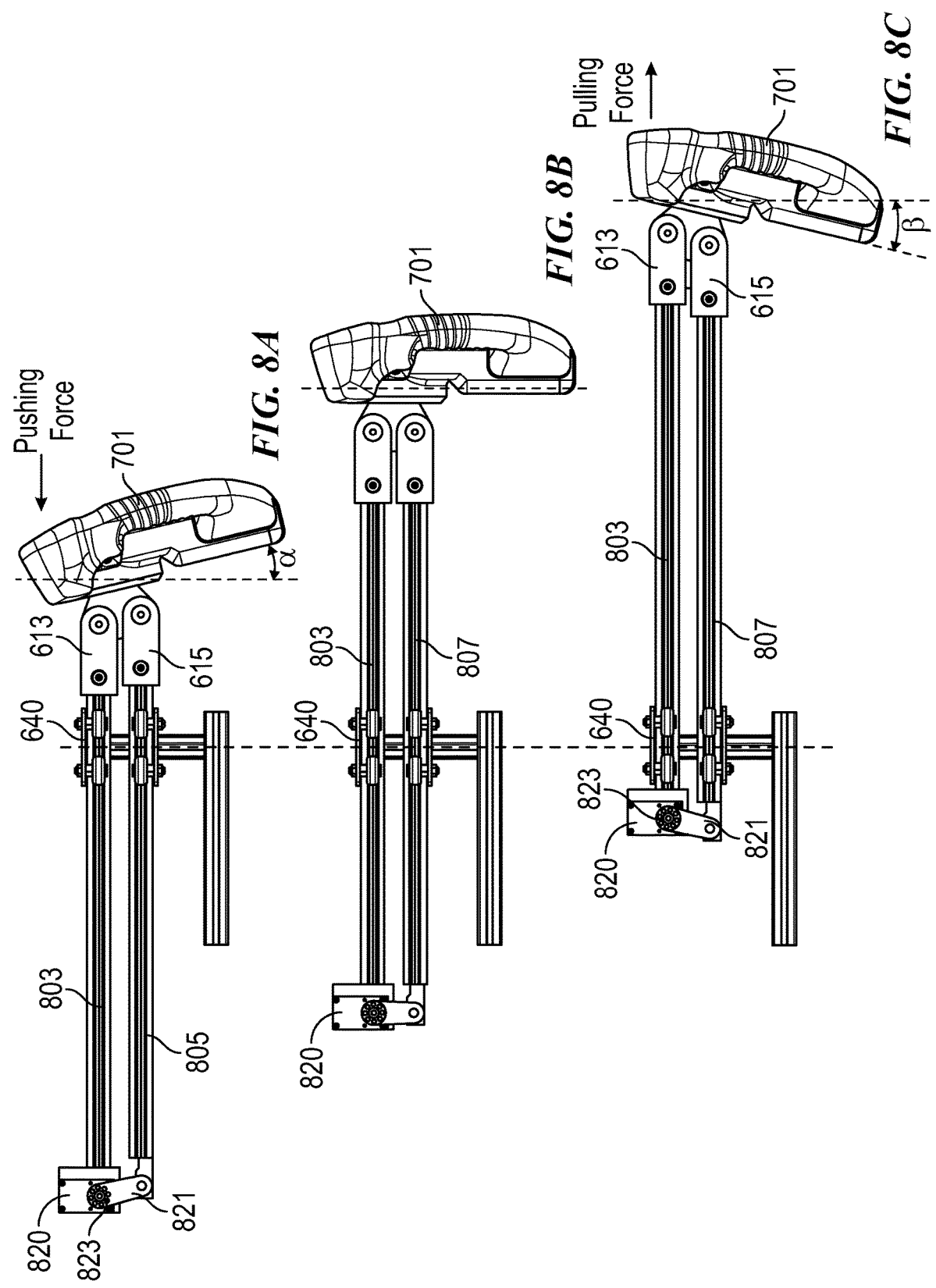
FIGS. 8A-8C illustrate movements of another example yoke configured in accordance with one or more embodiments of the present technology.

In some embodiments, the connector can be implemented using one or more actuators. FIG. 8A illustrates the movements of the yoke handle 701 in accordance with another representative embodiment of the present technology. In this example, a first linkage (e.g., an elongated member) 803 and a second linkage 805 are interlinked via a connector 820. The linkages are also supported by the bracket 640, which is separated from the connector 820 in FIGS. 8A-8C. The connector 820 can be implemented using one or more motors or other actuators 823, and a crank 821. The first linkage 803 and the second linkage 805 are translationally interlinked via the crank 821. In some embodiments, the one or more motors 823 can drive the movement of the second linkage 805 such that the first linkage 803 and the second linkage 805 are positioned slightly differently to simulate the rotation of the yoke handle 701 about an axis closer to the ground. In any of these embodiments, the motor(s) and/or other actuator(s) can have any suitable arrangement and/or configuration, e.g., linear, rotary, and/or other.

When the yoke handle 701 is pulled, the pulling force is applied to at least one of the interfaces 613, 615, thereby activating the one or more motors 823. The one or more motors 823 are configured to drive the movement of the crank 821 so as to translate the first and second linkages 803, 805 in opposite directions. This differential translational movement generates a tilt angle θ that simulates the pivoting motion in a real aircraft when the yoke handle is pulled back.

FIG. 8B illustrates the yoke when the yoke handle 701 is pushed to an intermediate position, and FIG. 8C illustrates the handle 701 when it is pushed fully forward.

It is noted that the examples shown in FIGS. 7A-8C are representative implementations of the connector, the first bar, and the second bar of the anchoring device. Other coupling mechanisms (e.g., belts, pulleys, different types of rotors) suitable for a remote center of motion mechanism can also be used to implement the anchoring device for the yoke.

FIG. 9 is a flowchart representation of a method 900 for making, assembling, and/or using a flight simulation system in accordance with one or more embodiments of the present technology. The method 900 includes, at block 910, coupling a yoke handle to an anchoring device of the flight simulation system. In some embodiments, the method further includes coupling at least a seat or a throttle to the flight simulation system. For example, when components of the flight simulation system, such as the yoke, the foldable platform, the throttle, and/or the seat, are transferred to a new training site, a user can first assemble the components and couple the yoke to the anchoring device of the foldable platform. The anchoring device comprises two bars connected to a first section and a second section of the yoke, such as in the manner shown in FIGS. 7A-8C. The user then can start ground training using the flight simulation system.

The method 900 can include, at block 920, enabling an operation of the flight simulation system such that when the yoke handle is translated, it tilts about a rotation axis that is offset from the yoke handle, e.g., in a downward direction. The rotation axis can, for example, be below the stimulator seat, or at or below the floor or other surface on which the simulation system is supported. Accordingly, the method can include enabling the operation of the flight simulation system such that the yoke is pushed to simulate a descent of the aircraft and pulled to simulate an ascent, with the yoke in a different tilted position when pushed than when pulled (e.g., as shown in FIGS. 7A-8C). The different tilting positions of the yoke can simulate the pivoting motion of the control yoke in real aircraft.

In some embodiments, the method includes decoupling the yoke from the anchoring device of the flight simulation system and folding the flight simulation system into a folded configuration. In some embodiments, the method also includes decoupling a seat from the flight simulation system prior to folding the flight simulation system. For example, when the ground training completes and/or the flight simulation system needs to be transferred to a different training site, the components can be disassembled and easily shipped to the next training location.

It will be appreciated that the disclosed techniques can simulate accurate feedback of the control yoke in real aircraft, thereby improving the effectiveness of ground training using flight simulation systems. The yoke can slide in and out of the anchoring device in a very small space, while accurately mimicking the arc of an actual control yoke in real aircraft. Simulation results have demonstrated that the movement and tilting of the disclosed flight simulation device can match the movement of the control yoke of the B52 aircraft. The disclosed techniques can also be implemented to obtain a compact flight simulation system that can be easily stored and be transferrable across different training sites. In addition to or in lieu of the foregoing advantages, embodiments of the present technology require smaller amounts of energy to provide realistic haptic feedback to the pilot. This is so for at least the reason that the motors providing such feedback do not have to operate with a much smaller moment arm than the pilot does, contrary to the conventional arrangement discussed above with reference to FIG. 3.

While the present disclosure contains many specifics, these should not be construed as limitations on the scope of the technology, but rather as descriptions of features that may be specific to particular embodiments of the technology. Certain features that are described in this disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this disclosure should not be understood as requiring such separation in all embodiments.

Only a few implementations and examples are described and other implementations, enhancements and variations can be made based on what is described and illustrated in this disclosure.

We claim:

1. A flight simulation system, comprising:

a yoke handle; and an anchoring device operably connected to the yoke handle, wherein the anchoring device comprises:

a first linkage pivotably coupled to a first section of the yoke handle, a second linkage pivotably coupled to a second section of the yoke handle, and a connector coupled to the first linkage and the second linkage, wherein, when the yoke handle is pushed or pulled, a translational movement of one of the linkages is greater than a translational movement of the other linkage such that the yoke handle tilts about a rotation axis offset from the yoke handle.

2. The flight simulation system of claim 1, wherein the connector comprises one or more circular gears.

3. The flight simulation system of claim 2, wherein the first linkage comprises a first linear gear coupled to the connector, and the second linkage comprises a second linear gear coupled to the connector.

4. The flight simulation system of claim 3, wherein the one or more circular gears include a first circular gear meshed with the first linear gear, and a second circular gear meshed with the second linear gear, and wherein the first circular gear and the first linear gear have a first pitch, and the second circular gear and the second linear gear have a second pitch different than the first pitch.

5. The flight simulation system of claim 1, wherein the connector comprises one or more motors.

6. The flight simulation system of claim 5, wherein the connector further comprises a crank pivotably coupled between the first and second linkages.

7. The flight simulation system of claim 1, further comprising a visual display configured to present an image responsive to motion of the yoke handle.

8. The flight simulation system of claim 7, further comprising a foldable platform that is removably coupled to the anchoring device.

9. The flight simulation system of claim 7, further comprising a support platform and a seat.

10. The flight simulation system of claim 7, wherein the rotation axis is below the seat.

11. The flight simulation system of claim 7, further comprising a throttle that is removably coupled to the flight simulation system.

12. An anchoring device for simulating yoke control of an aircraft, comprising:

a first elongated member pivotably coupled to a first section of a yoke handle, a second elongated member pivotably coupled to a second section of the yoke handle, and a connector coupled between the first elongated member and the second elongated member, wherein, when the yoke handle is pushed in a first direction, the first elongated member is in a first translational position and the second elongated member is in a second translational position such that the yoke handle is tilted at a first angle, and wherein, when the yoke handle is pulled in a second direction that is opposite to the first direction, the first elongated member is in a third translational position and the second elongated member is in a fourth translational position such that the yoke handle is tilted at a second angle different than the first angle.

13. The anchoring device of claim 12, wherein the connector comprises one or more gears.

14. The anchoring device of claim 13, wherein the first elongated member comprises a first linear gear coupled to the connector, and the second elongated member comprises a second linear gear coupled to the connector.

15. The anchoring device of claim 14, wherein the connector includes a first circular gear meshed with the first linear gear, and a second circular gear meshed with the second linear gear, the first and second circular gears being connected to each other to rotate as a unit, the first gear having a different pitch than the second gear.

16. The anchoring device of claim 15, wherein the connector comprises one or more motors.

17. The anchoring device of claim 16, wherein the connector further comprises a crank that is configured to drive a movement of the second elongated member.

18. A method providing a flight simulation system, comprising:

coupling a yoke handle to an anchoring device of the flight simulation system, wherein the anchoring device comprises a first link connected to a first section of the yoke handle and a second link coupled to a second section of the yoke handle; and coupling a connector between the first and second links such that when the yoke handle is translated, it tilts about a rotation axis that is offset from the yoke handle.

19. The method of claim 18, further comprising:

operably coupling the yoke handle to a feedback subsystem, the feedback subsystem comprising at least a virtual reality headset, a display device, or an audio speaker, the feedback system being responsive to motion of the yoke handle.

20. The method of claim 18, wherein coupling the connector between the first and second links includes meshing a first pinion having a first gear pitch to a first rack of the first link, and meshing a second pinion having a second gear pitch, different than the first gear pitch, to the second link, with the first and second pinions connected to rotate as a unit.

* * * * *